United States Patent [19]

Dayton et al.

[11] Patent Number: 4,654,696

[45] Date of Patent: Mar. 31, 1987

[54] VIDEO SIGNAL FORMAT

[75] Inventors: Birney D. Dayton, Nevada City; Leon J. Stanger, Grass Valley, both of Calif.

[73] Assignee: Grass Valley Group, Inc., Grass Valley, Calif.

[21] Appl. No.: 721,515

[22] Filed: Apr. 9, 1985

[51] Int. Cl.[4] .............................................. H04N 11/06
[52] U.S. Cl. .......................................... 358/11; 358/12
[58] Field of Search .................... 358/11, 12, 13, 180, 358/214, 54

[56] References Cited

U.S. PATENT DOCUMENTS

| | | | |
|---|---|---|---|
| 4,394,690 | 7/1983 | Kobayashi | 358/180 |
| 4,476,493 | 10/1984 | Poetsch | 358/214 |
| 4,516,150 | 5/1985 | Gurley | 358/13 |
| 4,551,754 | 11/1985 | Meise | 358/180 |
| 4,581,640 | 4/1986 | Cole | 358/141 |

FOREIGN PATENT DOCUMENTS 2144298A 2/1985 United Kingdom .................. 358/12

OTHER PUBLICATIONS

Wendlund, SMPTE Journal, Oct. 1983, pp. 1034–1035.

*Primary Examiner*—Michael A. Masinick
*Attorney, Agent, or Firm*—John Smith-Hill; Francis I. Gray

[57] ABSTRACT

A video signal that is representative of a wide scene comprises signal elements corresponding to a plurality of horizontal line intervals of a raster. A luminance component and two chrominance components are included in each horizontal line interval, in time-compressed sequential relationship. The video signal also incorporates information representative of a number in the range from zero to the difference between the aspect ratio of the wide scene and the aspect ratio of a scene represented by a conventional video signal format. This information determines the portion of the wide scene that is represented by a video signal of the conventional format derived from the video signal representative of the wide scene.

40 Claims, 8 Drawing Figures

VIDEO SIGNAL FORMAT

This invention relates to a video signal format, particularly a signal format that is compatible with both narrow screen and wide screen displays.

A motion picture may be recorded photographically, on film, or it may be recorded on videotape. A motion picture film is normally displayed by projecting a light beam through the film onto a display screen. However, when a motion picture that has been initially recorded on photographic film is to be shown on television, the motion picture is generally transferred to video tape, and the video tape is then used to generate the electrical signal that is employed to modulate the amplitude or frequency of the carrier wave that is transmitted. This transfer from photographic film to video tape is accomplished using a film chain, by whic each frame of the film is scanned in a raster pattern corresponding to the desired television signal format, e.g. NTSC or PAL. However, motion picture films are produced for theater display with an aspect ratio (width to height ratio of the recorded scene) of 16:9 or 1.78:1, whereas a conventional television display (which term is used herein to encompass both a television monitor and a television broadcast receiver) has an aspect ratio of 4:3 or 1.33:1. Unless a motion picture is filmed especially for television showing, with an aspect ratio of 4:3, difficulties may arise when a motion picture film is used as the basis for a television broadcast. Consider, for example, a scene in which two persons, identified as L (left) and R (right), are conversing over a dinner table having a table setting including a candle. In the conventional motion picture film scene, the heads of both L and R can be seen with the candle between them, and the conversation that is heard can be clearly related to the visual image. However, if this scene is shown on a television display without modification, and equal portions of the left and right margins of the scene are omitted owing to the smaller aspect ratio of the television display, the backs of the heads of L and R may be omitted from the picture that is seen or, in an extreme case, the heads of L and R are omitted entirely, and the television viewer sees only the candle. In this case there is no correlation between the information that is acquired aurally and the information that is acquired visually. Accordingly, it is conventional in the television industry, when scanning a motion picture film in order to produce a videotape, for the operator of the film chain to effectively pan from side to side of the film scene in order to provide correlation between aural information and visual information. In the example just given, when L is speaking the television image would be produced by omitting a greater portion of the right side of the film image than of the left side, so that the television image would include both the candle and L's head. Similarly, while R is speaking the television image would be derived by omitting a greater portion of the left side of the film image than of the right side, so that the television viewer sees R's head and the candle. While imperfect, this technique serves to maintain correlation between the aural and visual information.

Figure 1:
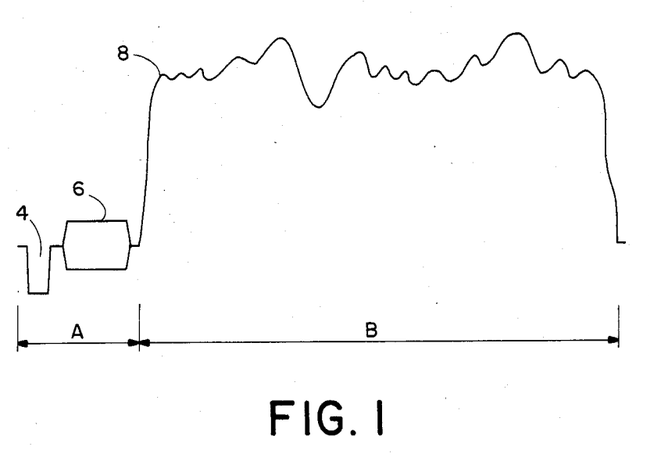
FIG. 1 illustrates in simplified manner the waveform of the NTSC signal.

The waveform for one horizontal line of the conventional baseband NTSC color television signal is shown diagrammatically in FIG. 1. The waveform has two main portions: namely a synchronizing or blanking interval A which includes the horizontal sync pulse 4 and the color burst 6, and an active picture interval B which contains the signal 8 embodying chrominance and luminance information. The duration of the horizontal interval of the signal (A+B) is about 63.5 µs. The horizontal synchronizing interval A occupies about eighteen percent of the total horizontal interval, leaving about eighty-two percent (about 52 µs) available for the active picture interval.

The waveform shown in FIG. 1 is produced from the output signals provided by a television camera which produces red, green and blue color component signals (R, G and B) by feeding the three color component signals to a matrix which generates from the R, G and B signals a luminance signal (Y) and two chrominance or color difference signals C1 (normally B−Y) and C2 (normally R−Y). The two color difference signals are used to modulate respective continuous wave color subcarrier signals, each having a frequency of 3.58 MHz but in phase quadrature with one another, and the two amplitudemodulated subcarrier signals, with the subcarrier suppressed, are added to the luminance signal. Assuming that it is desired to broadcast the resulting baseband composite video signal, the video signal is then used to modulate a transmission carrier.

At the receiver, the modulated transmission carrier is demodulated to produce the baseband composite video signal and ultimately the original R, G and B signals are reconstructed and are used to drive the corresponding electron guns of the television display.

In the NTSC system, each frame comprises 525 lines interlaced 2:1, and the frame repetition rate is 30 Hz.

It has been proposed that a high definition television (HDTV) system should be established having 1050 lines per frame, interlaced 2:1 and with a frame repetition rate of 30 Hz. The HDTV signal would have the same general form as the NTSC signal shown in FIG. 1, but would have a higher frequency bandwidth and a line scan rate twice that of the NTSC signal. Ideally, this signal would be compatible with existing NTSC receivers yet, with an appropriate HDTV receiver, would provide a picture having resolution approaching that which is obtainable by projection of a 35 mm film. Attainment of this ideal has proved to be elusive.

It has also been proposed, in U.S. Pat. No. 4,476,484 issued Oct. 9, 1984 to Haskell, that a compatible (with NTSC and HDTV) high definition television, or CHDTV, system should utilize a baseband signal having 1050 lines per frame, with the signal structure of each horizontal line essentially the same as that of the NTSC signal as described with reference to FIG. 1. While network distribution of the CHDTV signal might take place at a 1050 per frame line rate, local distribution would be effected by time expanding each line and transmitting the lines in pairs by time-frequency-multiplexing, so that the pair line rate is the same as the current NTSC line rate. Conventional NTSC receivers would detect only one line of each pair, i.e. to an NTSC receiver the signal would appear to be the usual 525 lines/frame signal, while an HDTV receiver would detect both lines of each pair, time compress each line and delay one line relative to the other, thus reconstructing the original 1050 lines/frame signal.

It is observed in U.S. Pat. No. 4,476,484 that most HDTV systems envisaged have a picture aspect ratio significantly larger than 4:3. It has in fact been suggested (though not in U.S. Pat. No. 4,476,484) that an aspect ratio of 16:9, i.e. the same aspect ratio as is currently used in conventional motion picture film, would be appropriate. Clearly, this would make it unnecessary when transferring a scene from film to videotape for transmission in the HDTV system to pan from side to side of the film scene in the manner described above. However, in the case of a CHDTV system, even if the resulting signal were technically compatible with the NTSC system, i.e. it would cause a picture to be produced on the screen of an NTSC receiver, the picture would not be satisfactory because it would be horizontally compressed, requiring vertical compression to compensate.

As indicated above, in the NTSC system luminance and chrominance signals are transmitted simultaneously, in frequency interleaved fashion. This signal structure does not lend itself well to FM transmission, owing to a rising noise characteristic in the upper end of the passband where the color subcarrier resides. However, it is desirable to transmit television signals by FM because of the FM signal's superior immunity to transmission noise, especially in satellite links.

It has previously been proposed that the television signal should be structured with the luminance information and chrominance information transmitted sequentially instead of simultaneously and with the chrominance and luminance information time-compressed. For example, in the MAC (for "multiplexed analog components") format, described in "MAC—A Television System for High Quality Satellite Broadcasting", IBA Experimental and Development Report 118/82, chrominance and luminance are transmitted sequentially in a time-compressed signal format. In the MAC format, the two chrominance components (designated U and V in the description of the MAC format since it employs the terminology used in connection with the PAL system) are transmitted on alternate lines. In describing the MAC format, the above-identified report makes the observation that conventional sync pulses are not required and are replaced by other synchronization information contained within the waveform. Thus, although the signal is similar to the PAL or NTSC signal, in that it carries in a succession of time intervals the information relating to a succession of scanned lines of the scene being televised, a greater part of the time interval is available for transmission of picture information since the horizontal sync pulses are not required.

In a practical implementation of the MAC format, known as A - MAC, time compression is achieved by sampling the video information and writing it into memory under control of a first clock pulse train and reading the informatio out of memory under control of a second pulse train having a higher frequency than the first pulse train. Luminance information is written into memory at a sampling frequency of 13.5 MHz and is read out of memory at a sampling frequency of 18 MHz, providing a time compression ratio of 4:3. Chrominance information is written into memory at a sampling frequency of 6.75 MHz and is read out of memory at a frequency of 18 MHz, for an 8:3 compression ratio. At the receiving end, the luminance and chrominance information is expanded in time to occupy the full active picture interval. The MAC system, however, was specifically designed to take advantage of proposals for direct broadcasting by satellite of television signals to receiving locations at which conventional television receivers are employed, a decoder being used to convert the MAC format signal to the PAL format. Thus, while the MAC system was proposed with a view to improving the quality of the displayed image, that system is not itself concerned with a high definition television system and does not solve the problem of accommodating within a given television signal format pictures of scenes having different aspect ratios.

U.S. Pat. No. 4,476,493, issued Oct. 9, 1984 to Poetsch et al, discusses the problem of the different aspect ratios of conventional motion picture films and television displays, and implies that the problem is exacerbated in the case of "Cinemascope" films, in which the effective aspect ratio is 2.35:1. In production of a Cinemascope film, optical picture information entering the film camera and representing a scene having an aspect ratio of 2.35:1 is distorted by optical compression in the horizontal direction so that it can be recorded in the usual 35 mm frame, having an aspect ratio of 16:9. In normal optical projection of a Cinemascope film, the projector includes a horizontally expanding lens which compensates for the horizontal compression that took place at the time of making of the film. Poetsch et al mentions that when showing the Cinemascope film on television it is necessary to shift the center of attention horizontally during scanning in order to avoid loss of important picture information at the sides of the picture, and that this may be achieved by bringing about a relative shifting movement between the scanning raster and the scanned image plane. Poetsch et al discloses a technique by which both the horizontal expansion and the horizontal shifting of the center of interest are achieved through purely electronic means. However, Poetsch et al does not address the problem of possible differences in the aspect ratios of television receivers, assuming that the receiver will always have an aspect ratio of 1.33:1.

SUMMARY OF THE INVENTION

According to a first aspect of the present invention there is provided a method of generating, from an input video signal of a first format, an output video signal that can be converted to a second format, a signal of said first format (a) being representative of a scene having a first aspect ratio, (b) comprising signal elements corresponding to a plurality of horizontal line intervals of a raster, said lines and said raster occurring at respective predetermined rates, and (c) including in each horizontal line interval, in time-coincident relationship, information relating to the amplitude of three primary color components of the scene, and a signal of said second format (a) being representative of a scene having a second aspect ratio, smaller than said first aspect ratio, (b) comprising signal elements corresponding to a plurality of horizontal line intervals of a raster, said lines and said raster of the second signal format occurring at respective predetermined rates, and (c) including in each horizontal line interval a luminance component and two chrominance components in time-coincident relationship, said method comprising forming a luminance component and two chrominance components from the signal elements of the input video signal, time-compressing the luminance and chrominance components and timedivision multiplexing the luminance and chrominance components into respective time slots during a succession of intervals occurring at a predetermined rate, and also incorporating within the output video signal information representative of a number in the range from zero to the difference between said aspect ratios.

According to a second aspect of the present invention there is provided a method of converting an input video signal of a second format, a signal of said first format (a) being representative of a scene having a first aspect ratio, (b) comprising signal elements corresponding to a plurality of horizontal line intervals of a raster, said lines and said raster occurring at respective predetermined rates, (c) including in each horizontal line interval, in time-compressed sequential relationship, a luminance component and two chrominance components, and (d) incorporating information representative of a number in the range from zero to the difference between said first aspect ratio and a second, smaller aspect ratio, and a signal of said second format (a) being representative of a scene having said second aspect ratio, (b) comprising signal elements corresponding to a plurality of horizontal line intervals of a raster, said lines and said raster of the second signal format occurring at respective predetermined rates, and (c) including in each horizontal line interval a luminance component and two chrominance components in time-coincident relationship said method comprising time-expanding the luminance and chrominance components of the input video signal and bringing said components into time-coincident relationship, utilizing said information to define, within the scene represented by the input video signal, a selected portion having said second aspect ratio, and excluding from the output video signal portions of the luminance and chrominance components that correspond to areas of the scene represented by the input video signal that are outside said selected portion.

According to a third aspect of the present invention there is provided apparatus for generating, from an input video signal of a first format, an output video signal that can be converted to a second format, a signal of said first format (a) being representative of a scene having a first aspect ratio, (b) comprising signal elements corresponding to a plurality of horizontal line intervals of a raster, said lines and said raster occurring at respective predetermined rates, and (c) including in each horizontal line interval, in time-coincident relationship, information relating to the amplitude of three primary color components of the scene, and a signal of said second format (a) being representative of a scene having a second aspect ratio, smaller than said first aspect ratio, (b) comprising signal elements corresponding to a plurality of horizontal line intervals of a raster, said lines and said raster of the second signal format occurring at respective predetermined rates, and (c) including in each horizontal line interval a luminance component and two chrominance components in time-coincident relationship, said apparatus comprising means for forming a luminance component and two chrominance components from the signal elements of the input video signal, means for timecompressing the luminance and chrominance components and time-division multiplexing the luminance and chrominance components into respective time slots during a succession of intervals occurring at a predetermined rate, and means for incorporating within the output video signal information representative of a number in the range from zero to the difference between said aspect ratios.

According to a fourth aspect of the present invention there is provided apparatus for converting an input video signal of a first format into an output video signal of a second format, a signal of said first format (a) being representative of a scene having a first aspect ratio, (b) comprising signal elements corresponding to a plurality of horizontal line intervals of a raster, said lines and said raster occurring at respective predetermined rates, (c) including in each horizontal line interval, in time-compressed sequential relationship, a luminance component and two chrominance components, and (d) incorporating information representative of a number in the range from zero to the difference between said first aspect ratio and a second smaller aspect ratio, and a signal of said second format (a) being representative of a scene having said second aspect ratio, (b) comprising signal elements corresponding to a plurality of horizontal line intervals of a raster, said lines and said raster of the second signal format occurring at respective predetermined rates, and (c) including in each horizontal line interval a luminance component and two chrominance components in time-coincident relationship, said apparatus comprising means for time-expanding the luminance and chrominance components of the input video signal and bringing said components into time-coincident relationship, and means for utilizing said information to define, within the scene represented by the input video signal, a selected portion having said second aspect ratio and to exclude from the output video signal portions of the luminance and chrominance components that correspond to areas of the scene represented by the input video signal that are outside said selected portion.

In a system utilizing the invention, an input video signal in color component (R, G, B), conventional (e.g. NTSC - type) coded, or conventional decoded (e.g. Y, I, Q) format and representing a wide aspect ratio scene is converted to a time-sequential luminance and chrominance format for transmission. The signal can be used by a wide aspect ratio display to show a picture of the entire scene represented by the input signal, and the information relating to difference in aspect ratios between the wide aspect ratio scene and the selected, narrower aspect ratio portion of that scene enables the signal to be used by a narrow aspect ratio display to show a picture of the selected portion of the scene.

It will be understood that the above-mentioned second signal format would normally be one of the present day conventional formats such as NTSC or PAL. Also, the line and raster rates of the first signal format (whether the color information is time-coincident as in the case of the first and third aspects or time-sequential as in the case of the second and fourth aspects) would generally be the same as the line and raster rates of one of the conventional formats, although the signal would represent a scene having a larger aspect ratio than that of the conventional formats. However, it is not essential that the line and raster rates for the first and second signal formats be the same. Similarly to U.S. Pat. No. 4,476,484, the input video signal could be an HDTV signal (with the color information in time-coincident relationship in the case of the first and third aspects of the invention and in time-compressed sequential relationship in the case of the second and fourth aspects) having line and raster rates that are integral multiples of the line and raster rates of of the second signal format. Moreover, the line and raster rates of the first signal format may correspond to one conventional format, e.g. PAL, and, operating on the luminance and chrominance components using standards conversion techniques, a signal conforming to another convention format, e. g. NTSC, may be produced. In the case of the first and third aspects of the invention, the standards conversion may take place prior to the multiplexing, or it may take place subsequently, during conversion of the output video signal to the signal of the second format. In the case of the second and fourth aspects, the standards conversion would take place during conversion from the first format to the second format.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 2:
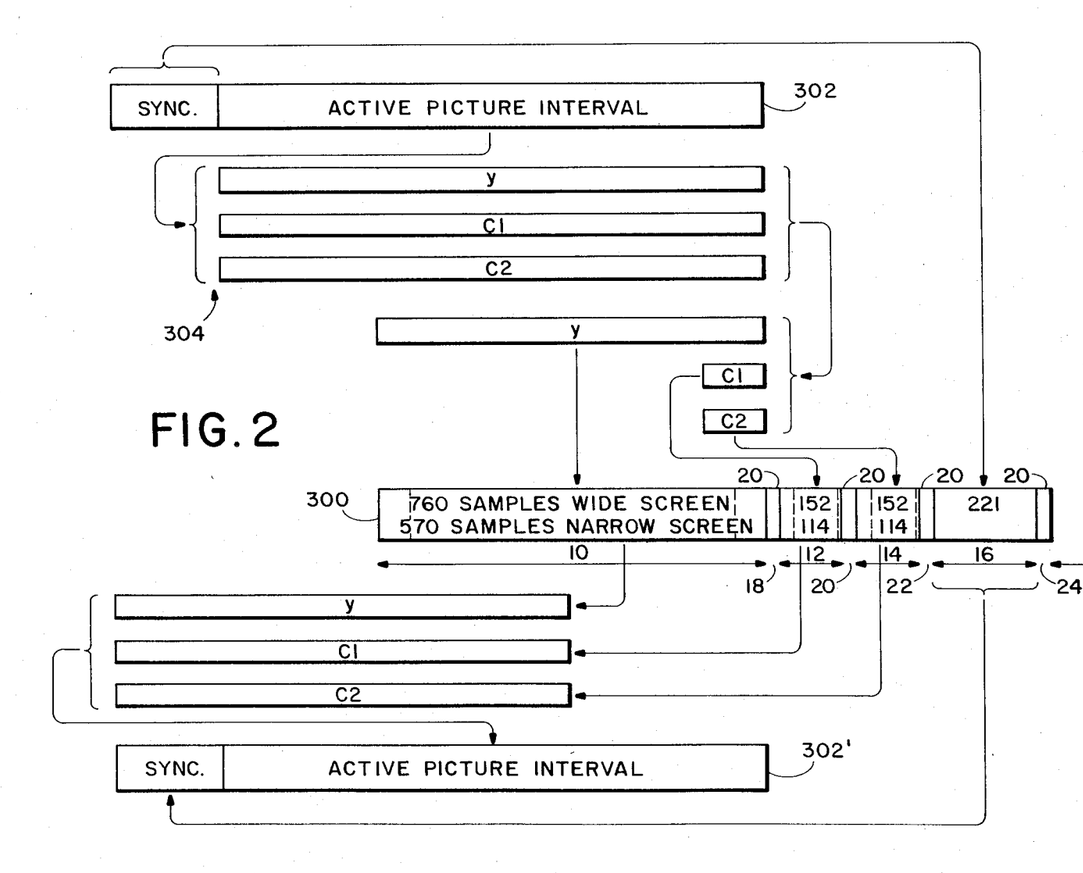
FIG. 2 illustrates the manner of generation of a signal format that is applicable to transmission of signals for wide screen television displays and is also compatible with narrow screen television displays.

FIG. 2 shows how a time-compressed component color television signal 300 is generated from a signal 302 in which the brightness and color information is not separated in time and which includes synchronization information for extracting the brightness and color information. As shown in FIG. 2, the signal 302 is separated into luminance (Y) and chrominance (C1, C2) components 304, and these components are time compressed and time-division multiplexed to produce the signal 300. The signal 302 is reconstructed, as signal 302', by separating the components, expanding them in time, bringing them into time coincidence, and recombining them.

In the signal 300 of FIG. 2, the horizontal line time is 63.5 μs, as in the NTSC system, and the line time is divided into four principal intervals or time slots, namely a luminance slot 10, first and second chrominance slots 12 and 14 and a data slot 16, and the various information-containing slots 10, 12, 14 and 16 are separated by dead periods 18, 20, 22 and 24 in which no information is transmitted.

The total line time is divided into 1,365 sample intervals which are equally spaced in time. 760 sample intervals are allocated to the luminance slot 10, 152 intervals are allocated to each of the chrominance slots 12 and 14, 221 intervals are allocated to the data slots 16 and twenty intervals are allocated to each of the dead periods 18, 20, 22, and 24.

Figures 3A, 3B:
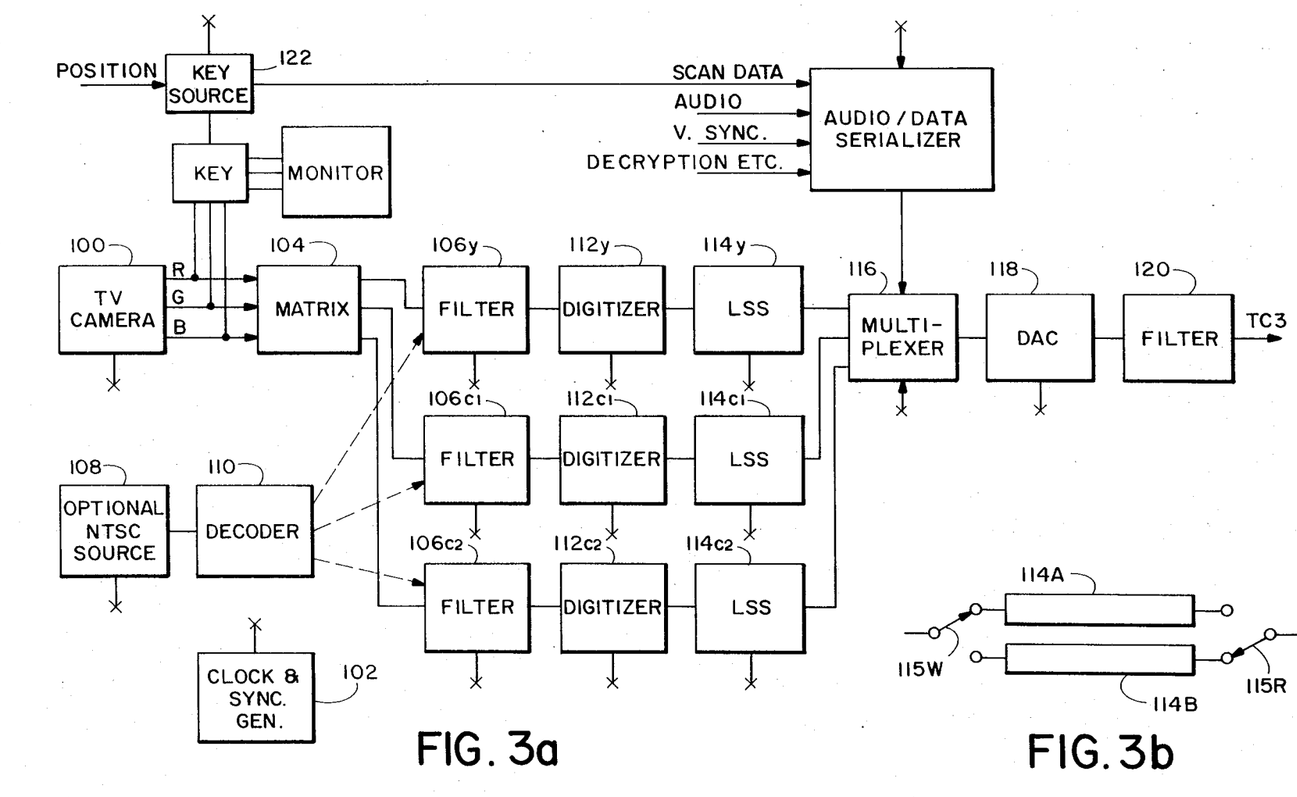
FIG. 3a is a block diagram of a transmitter for generating a signal having the format shown in FIG. 2.
FIG. 3b shows a component of the transmitter.
Figure 4:
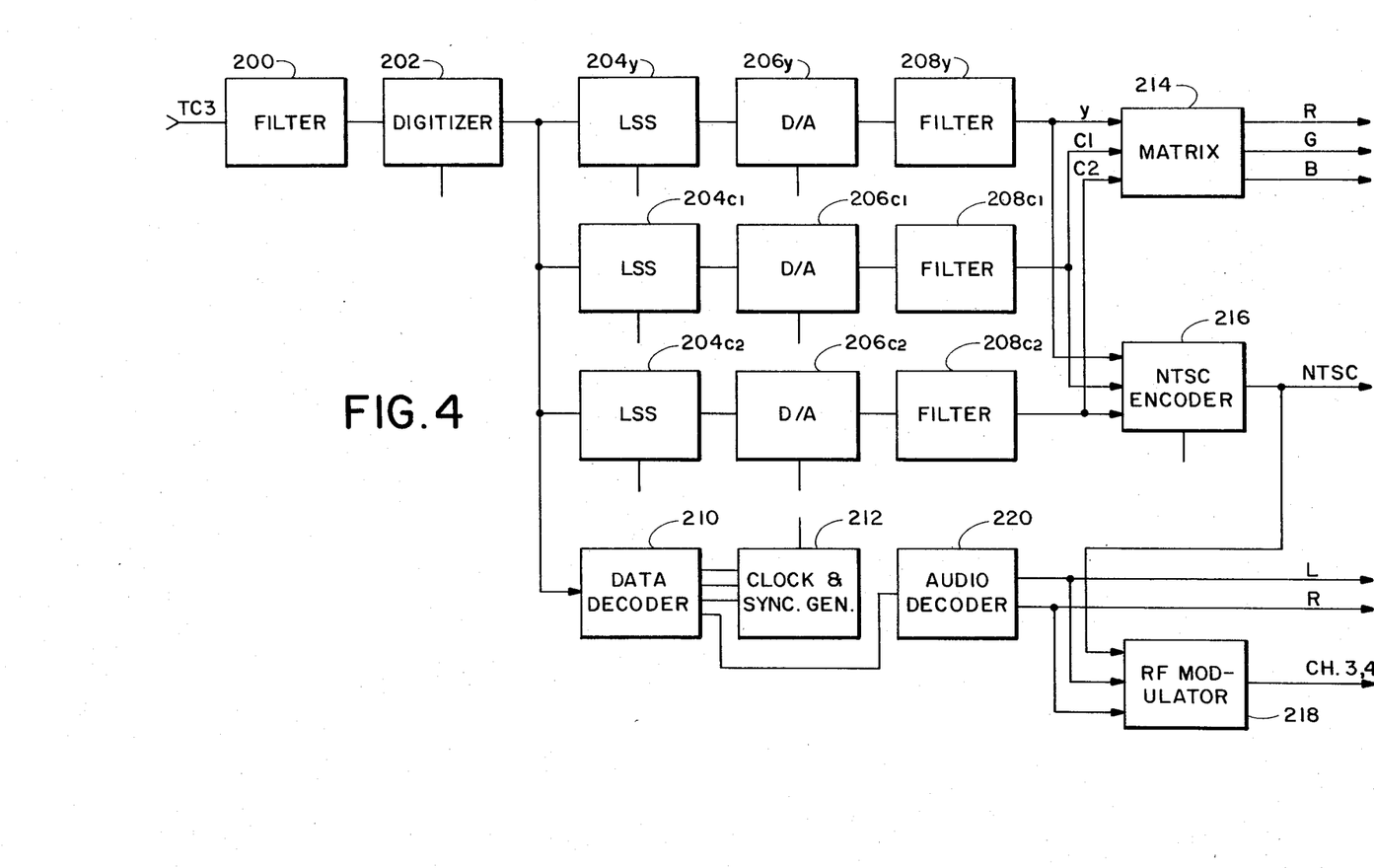
FIG. 4 is a block diagram of a receiver for decoding the FIG. 2 signal into a form suitable for use with either a wide screen or a narrow screen display.

The signal 300 shown in FIG. 2 may be constructed using the transmitter shown in FIG. 3 and decoded using the receiver shown in FIG. 4. The transmitter is designed to be used at the point of origin of a signal that is to be transmitted over a DBS (direct broadcast by satellite) television system. The receiver is designed to be located at the viewing location, and is used to render the signals received from the satellite compatible with the viewer's television display. The receiver thus has two possible modes of operation, depending on whether the display is a conventional NTSC receiver having a 4:3 aspect ratio or has a 16:9 aspect ratio.

As shown in FIG. 3, a television camera 100 generates three color component signals R, G and B. The individual image-pick-up tubes of the camera are controlled in their scanning by horizontal and vertical sync pulses derived from a clock and sync pulse generator 102. The component signals R, G and B are applied to a matrix 104 and are converted, in known manner, into a luminance signal Y and two chrominance signals C1 and C2. The three signals Y, C1 and C2 are generated simultaneously for each horizontal scan line of the raster defined by the camera 100. Each scan line has the same duration as the NTSC scan line, but there is a horizontal blanking interval associated with each scan line and having a duration of 18% of the duration of the NTSC scan line. Thus, the active picture interval for each of the signals Y, C1 and C2 is the same as the active picture interval of the NTSC signal. The raster defined by the camera 100 has 525 lines, interlaced 2:1, and a frame rate of 30 Hz, and is thus the same as the NTSC raster in these respects also. However, the aspect ratio of the raster is 16:9 and therefore the signals Y, C1 and C2 represent a wider picture than does the NTSC signal.

The signals Y, C1 and C2 are applied to respective channels each including digitizers 112 and a line shift and shuffle (LSS) circuit 114. At the input of each channel is a low-pass filter 106 to prevent aliasing in the digitizers. Alternatively, a source 108 of an NTSC baseband signal is connected to apply the composite video signal to a decoder 110 which decodes the composite NTSC signal into its components Y, C1 and C2 and these component signals are applied to the filters 106. The durations of the lines and the line rates of the signals applied to the filters 106 are the same, regardless of whether they were derived from the camera 100 or the source 108. Each digitizer 112 comprises known circuits such as a sample and hold and an analog to digital converter (ADC). The sample and hold samples the output of the filter 106 under control of clock pulses provided by the clock and sync pulse generator 102, and the ADC converts the analog voltage signal provided by the sample and hold into an eight bit parallel digital signal. The clock pulses applied to the digitizer 112γ have a frequency of 910 $f_H$ (where $f_H$ is the horizontal line rate) so that approximately 749 samples are generated within the active picture interval of each line. The additional 11 samples (from 749 samples to the 760 possible samples that can be accommodated in the luminance time slot) are included to allow for possible deviation between the actual duration of the active picture interval and the nominal duration of that interval. The digital output of the digitizer 112 is applied to the LSS circuit 114. As shown in FIG. 3b, each LSS circuit 114 may comprise a pair of first in/first out (FIFO) shift registers 114a and 114B, an input multiplexer 115W and an output multiplexer 115R. Each shift register comprises eight serial in, serial out shift registers connected in parallel. The multiplexers 115W and 115R are controlled so that during a given line of the video signal digital words generated by the digitizer 112 are written into the register 114A, for example, and digital words are read out of the register 114B. On the next line, the register 114A is in the read state and the register 114B is in the write state.

The digital signals are written into the shift registers under control of clock pulses having a frequency of 910 $f_H$. It will be recalled that in the case of the camera 100 the aspect ratio of the scene being televised is 16:9, not 4:3, and therefore the successive samples represent points that are farther apart on the scene than are the points represented by samples of an NTSC signal provided by the source 108 and divided into 910 adjacent samples. In fact, from the relationship of aspect ratios it will be understood that 570 samples would represent a scene having an aspect ratio of 4:3.

The sequence of 760 samples generated by the digitizer 112$_Y$ and clocked into LSS 114$_Y$ under control of the signal at 910f$_H$ is then clocked out of the LSS 114$_Y$ by a multiplexer 116 (which may incorporate the multiplexers 115R) under control of a clock signal at frequency 1365f$_H$ for a compression ratio of 3:2. The multiplexer 116 operates under control of the horizontal sync pulses and addresses the LSS 114$_Y$ at a predetermined time following each horizontal sync pulse, thus defining a time slot within the horizontal line interval for receiving the time-compressed digital luminance information.

In similar manner, the filtered chrominance signals C1 and C2 are digitized and time-compressed. It is well known that the human eye is more tolerant of lack of horizontal resolution in chrominance than in luminance, and therefore the chrominance components C1 and C2 are digitized under control of a lower-frequency clock signal than is the luminance component. For example, the clock pulses for controlling the digitizers 112C1 and 112C2 and for writing into the LSS's 114 C1 and 114 C2 may be 182f$_H$ (=910f$_H$/5), yielding 152 (=760/5) samples of C1 and C2 for each horizontal line. Again, these values represent the wide aspect ratio scene, and the narrower ratio scene would be represented by 114 of those samples. The multiplexer 116 addresses the three LSS's in sequence within the horizontal line interval defined between successive horizontal sync pulses, and thus establishes discrete time slots for the signal components Y, C1 and C2. The output signal from the multiplexer is applied to a digital to analog converter 118, which converts the digital signal provided by the multiplexer into analog form under control of a clock signal at frequency 1365f$_H$, and the output signal from the DAC 118 is applied to a low-pass filter 120. The output signal from the filter 120 is an analog time-compressed color component signal which can be transmitted by frequency modulation without causing intermodulation between the luminance and chrominance components.

The chrominance and luminance components of the video signal occupy no more than 1064 of the 1365 available sample intervals. Of the remaining sample intervals, 221 are dedicated to transmission of data and 20 are dedicated to separation of each two adjacent time slots. At 221 data words within each horizontal line of the NTSC signal format, this allows for transmission of data at a maximum rate of 1.74 MB biphase or 1.8 MB complemented quad. This data could include keys to encryption, keys to error correction and detection, digitized audio, vertical sync information, data indicating whether the signal source is a wide aspect ratio or narrow aspect ratio source, data to facilitate conversion of the time-compressed color component output signal into a signal having a format that presents a narrower aspect ratio, such as the NTSC format (referred to hereinafter as scan data), and other types of data.

The scan data is normally produced under control of the program producer. The wide (16:9 aspect ratio) scene is viewed by the producer on a monitor, and the producer frames a narrower (4:3 ratio) scene within the wide scene, e.g. with the aid of a movable window that is keyed into the video signal representing the wide scene. The narrower scene has the same height as the wider scene, and it has a constant width equal to three-quarters of the width of the wider scene, so that either or both of its lateral edges are spaced from the corresponding edge of the wider scene. The keying signal comprises two pulses that occur within the active picture interval at an interval of 39 $\mu$s 63.5 $\mu$s×82%×¾) but can be shifted, as a pair, towards the beginning or end of the active picture interval. The key signal source 122 also generates a signal representative of the position of the movable window within the wide scene. This position information is the raw scan data. The raw scan data is a number in the range from zero to 0.45 (1.78−1.33) and represents the distance, expressed as a fraction of the height of the scene, between the left edge of the narrow scene and the left edge of the wide scene. The raw scan data is used to generate normalized scan data (=raw scan data×190/0.45), which represents the number of samples between the beginning of the sequence of luminance samples and the beginning of that shorter sequence of samples that contains the correct number of samples to provide a picture having an aspect ratio of 4:3. The scan data that is encoded in the data interval may be encoded directly from the raw scan data or it may be encoded from the normalized scan data. Clearly, it is not necessary to include scan data in each line of the time-compressed signal or even in each frame. Scan data need be provided only when the program producer changes the address, within the sequence of 760 luminance samples, at which the sequence of samples that corresponds to a narrow scene starts. It is not necessary to have the ability to encode every possible value for the normalized scan data (all integers up to 190), since in practice only three values corresponding to left (normalized scan data =0), center (95) and right (190) would normally be necessary. Obviously, the more values that can be encoded, the smoother can the scanning be performed.

The receiver shown in FIG. 4 comprises a low-pass filter 200 followed by a digitizer 202 that converts the analog signal into eight bit digital form under control of a clock having a frequency of 1365f$_H$. The sequence of digital words is applied to a data decoder 210 and to three channels each including an LSS circuit 204, a DAC 206 and a low-pass filter 208. The data decoder recognizes the sync information transmitted during the data time slot and uses the sync information to generate clock and sync pulses for controlling the LSS circuits 204, the digitizer 202 and the data decoder 210. Thus, having recognised the sync information the data decoder 210 uses that information to insure that the LSS circuits 204 address the digitizer 202 only during the appropriate luminance or chrominance time slot, and that the data decoder 210 is written into only during the data time slot. The LSS circuits 204 are similar to the circuits 114 of the transmitter, but their operation is the converse to that of the circuits 114. Thus, the luminance samples are written into the LSS 204$_Y$ during the luminance time slot under control of clock pulses at a frequency of 1365f$_H$ but are read out of the circuit 204 and converted to analog form by the DAC 206 under control of a clock having frequency 910f$_H$, thus expanding the sequence of luminance samples to occupy the full active picture interval. Similarly, the chrominance samples are read from the circuits 204$_{C1}$ and 204$_{C2}$ and are converted to analog form by the circuits 206$_{C1}$ and 206$_{C2}$ under control of clock pulses at a frequency of 182f$_H$ so that each of the chrominance components occupies a time equal to the full active picture interval. In addition, the read-out of the samples Y and C1 from the LSS circuits $204_Y$ and $204_{C1}$ is delayed so that the three sequences Y, C1 and C2 are read out simultaneously. Each of the signal components Y, C1 and C2 occupies the full active picture interval of the horizontal line time, and the three components are filtered and combined either to produce RGB outputs or a baseband NTSC composite video signal. In fact, the NTSC baseband signal would not provide a satisfactory picture on a conventional NTSC receiver because the picture would be horizontally compressed.

The scan data is received by the clock and sync generator 212 and is used to modify the operation of the circuits 204 in the event that the received signal is to be used to provide a picture having a smaller aspect ratio than the aspect ratio of the original scene. Thus, if the normalized scan data provided directly by the key signal source 122, or generated by the data decoder 210 from raw scan data provided by the key signal source, represents the number 95, the sync generator 212 disables the LSS circuit $204_Y$ from receiving the first 95 samples provided within the luminance time slot, permits the circuit $204_Y$ to receive the next 570 samples and then disables the circuit from receiving any more samples within the luminance time slot. In fact, 95 samples would remain within the luminance time slot, and accordingly the 570 samples that were received would represent a portion of the wide scene that lies equidistant from the lateral edges of the wide scene. Similarly, the clock and sync generator 212 disables the circuits $204_{C1}$ and $204_{C2}$ from receiving the first 95/5(=19) samples within the respective chrominance time slots and permits the circuit to receive the next 114 samples within each chrominance slot.

The set of 570 luminance samples is read out of the LSS circuit $204_y$ at a frequency of $682.5 f_H$ and the two sets of 114 chrominance samples is read out of the LSS circuits $204_{c1,c2}$ at a frequency of $136.5 f_H$. The three sets of samples each occupy the entire active picture interval of the horizontal line time, and upon synchronizing the three sets of samples and combining them in the matrix 214 or the encoder 216 a baseband signal that represents a scene having a 4:3 aspect ratio will result. As the normalized scan data varies, from a minimum of zero to a maximum of 190, the 4:3 aspect ratio scene shifts from left to right within the 16:9 aspect ratio scene.

If the signal originally transmitted was derived from the NTSC source, and thus had a 4:3 aspect ratio, and the display had a 16:9 aspect ratio, the scan data would cause the clock and sync generator 212 to read the luminance and chrominance samples out of the circuits 204 at an increased rate, so as to compress the luminance and chrominance components and provide a picture having a 4:3 aspect ratio. In the case of a display having a 4:3 aspect ratio, the scan data would cause the generator 212 to read the samples out of the circuits 204 at $910 f_H$ (for Y) and $182 f_H$ (for C1 and C2), and no samples would be omitted, since there would be no need for lateral compression of the picture. It is for this reason that the data words that are transmitted include data indicating whether the signal source is a wide aspect ratio or narrow aspect ratio source.

The data decoder 210 provides decoded audio data to an audio decoder 220 which provides left and right channel outputs to stereo amplifiers (not shown). The outputs of the NTSC encoder 216 and of the audio decoder 220 may be connected to an RF modulator 218 to provide a channel 3 or 4 output.

Figures 5, 6:
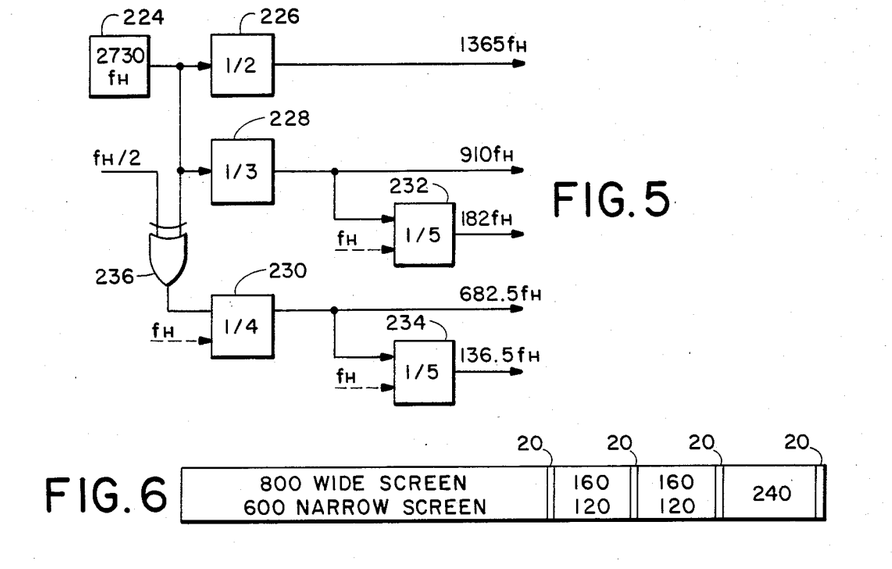
FIG. 5 is a block diagram of the clock generator of the FIG. 4 receiver.
FIG. 6 illustrates a modification of the FIG. 2 signal format and FIGS. 7a and 7b illustrate a modification of FIG. 5 and also illustrate the corresponding signal format.

FIG. 5 is a block diagram showing how all the necessary clocks in the receiver can be generated using a single master clock generator 224 and frequency dividers. The master clock 224 has a frequency of $2730 f_H$, or 12 $f_{sc}$ (where $f_{sc}$ represents subcarrier frequency), and all the necessary clocks can be generated using a divide by two counter 226, a divide by 3 counter 228, a divide by 4 counter 230 and two divide by 5 counters 232, 234. An exclusive OR circuit 236 is connected to the input of the divide by 4 counter 230 in order to shift the phase of the output of the counter 230 by half a count at the start of each line. This is necessary in order to bring the clocks into phase at the beginning of each line, because the frequencies of the clocks provided by the counters 230 and 234 are not integral multiples of $f_H$. An alternative means of achieving the same result would be to have each counter which produces a clock that is not an integral multiple of $f_H$ reset at the start of each line by a clock at frequency $f_H$, as shown in broken lines.

In a modification of the system described with reference to FIGS. 2-5, the master clock has a frequency of $2880 f_H$ and the structure of the timecompressed color component signal is as shown in FIG. 6. In the case of this modification, the exclusive OR circuit 236 is not required because each clock is an integral multiple of $f_H$ and therefore all clocks are in phase at the start of each line.

In a further modification, greater chrominance bandwidth is provided at the expense of data time and dead time between adjacent time slots. The master clock has a frequency of 2880 $f_H$, luminance being sampled at a frequency of $960 f_H$ and chrominance at a frequency of $240 f_H$, equivalent to 15.1 MHz and 3.78 MHz respectively. This implies that luminance signals having frequency components of up to 7.56 MHz and chrominance signals having frequency components of up to 1.89 MHz can be reconstructed from the samples. The luminance bandwidth is then approximately equal to $0.82 \times 7.56$ MHz (=6.2 MHz) and the chrominance bandwidth is approximately equal to $0.5 \times 1.89$ MHz (equals 0.945 MHz), it being assumed that the filter $208_Y$ has a sharp cutoff and the filters $208_{C1}$ and $208_{C2}$ each have a more Gaussian cut-off. In this case, the counters 232 and 234 of FIG. 5 are replaced by divide by four counters, providing clock frequencies of $240 f_H$ and $180 f_H$ for wide screen chrominance and narrow screen chrominance read-out respectively, and it is neither necessary to provide reset inputs for any of the counters nor the exclusive OR circuit 236 of FIG. 5.

Figure 7A:
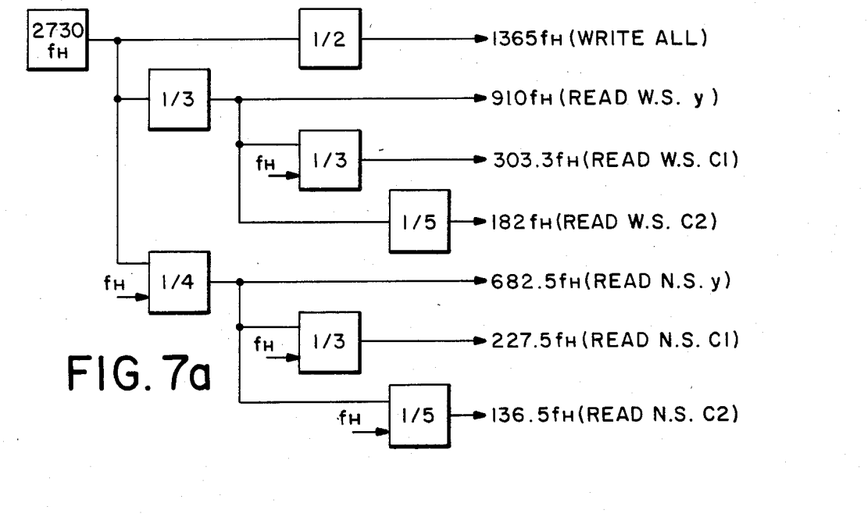
Figure 7B:
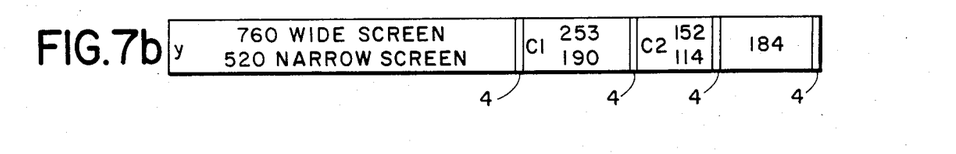

Under some circumstances, it may be desirable for the two chrominance components to have different bandwidths. The human eye is better able to resolve fine detail in blue shades than in red shades, and accordingly is more tolerant of poor resolution in red shades than in blue shades. Consequently, it may be desirable for the B−Y chrominance component to have a greater bandwidth than the P−Y chrominance component, and FIG. 7 illustrates how this might be achieved using a master clock having a frequency of $2,730 f_H$. As shown in FIG. 7b, 253 samples of the component C1 (herein assumed to be B−Y) are produced, at the expense of the component C2 (152 samples) and of data and of dead time between the time slots. The arrangement of counters shown in FIG. 7a avoids the need for the exclusive OR gate of FIG. 5 by virtue of the resetting to zero at the beginning of each line of the counters which produce clocks that are not integrally related to $f_H$.

It will be appreciated that the invention is not restricted to the particular methods and circuits that have been described and shown, since variations may be made therein without departing from the scope of the invention as defined in the appended claims, and equivalents thereof. For example, in the case of the counter arrangement shown in FIG. 7a, each of the counters could divide by any number and the circuit would still operate to produce clock signals capable of dividing the horizontal interval into the necessary time slots, provided each counter is reset at the start of each line. Of course, limitations are imposed by the need to preserve bandwidth of signal components. In addition, it is not essential that the specific order of the time slots shown in the drawings be followed. The luminance, chrominance and data time slots could occur in any order and the sequence could change from line to line as part of a scheme for encryption of the input video signal. The circuits shown in FIGS. 3 and 4 are presented purely by way of example. It would in principle be possible to replace the digitizers 112, LSS circuits 114, multiplexer 116 and DAC 118 of FIG. 3 with a charge-coupled device, and similarly the digitizer 202, LSS circuits 204 and DACs 206 of FIG. 4 could be replaced by a charge-coupled device. Since the time-compressed color component signal that is transmitted is an analog signal, it is not essential that the clock frequencies used to reconstruct the signal in the receiver be the same as the clock frequencies used in the transmitter, so long as the ratios of the frequencies are substantially the same. In the receiver, it would generally be acceptable to digitize the signal to six or seven bits, instead of to eight bits as described.

We claim:

1. A method of generating from an input video signal of a first format an output video signal that can be converted to a second format, a signal of said first format
   (a) being representative of a scene having a first aspect ratio,
   (b) comprising signal elements corresponding to a plurality of horizontal line intervals of a raster, said lines and said raster occurring at respective predetermined rates, and
   (c) including in each horizontal line interval, in time-coincident relationship, information relating to the amplitude of three primary color components of the scene,
and a signal of said second format
   (a) being representative of a scene having a second aspect ratio, smaller than said first aspect ratio,
   (b) comprising signal elements corresponding to a plurality of horizontal line intervals of a raster, said lines and said raster of the second signal format occurring at respective predetermined rates, and
   (c) including in each horizontal line interval a luminance component and two chrominance components in time-coincident relationship,
said method comprising forming a luminance component and two chrominance components from the signal elements of the input video signal, time-compressing the luminance and chrominance components and time-division multiplexing the luminance and chrominance components into respective time slots during a succession of intervals occurring at a predetermined rate, and also incorporating within the output video signal information representative of a number in the range from zero to the difference between said aspect ratios.

2. A method according to claim 1, wherein the lines and raster of the second signal format occur at the same rates as the lines and raster of the first signal format, and the intervals containing said time slots occur at the same rate as the lines of the first signal format.

3. A method according to claim 1, wherein the raster of the second format occurs at the same rate as the raster of the first signal format, and the number of lines in the raster of the second format is equal to the number of lines in the raster of the first signal format divided by a positive integer.

4. A method according to claim 3, wherein said positive integer is equal to one and the intervals containing said time slots occur at the same rate as the lines of the first signal format.

5. A method according to claim 4, wherein the step of time-compressing the luminance and chrominance components is accomplished by digitizing each component and writing it into memory under control of a clock at a first frequency, and reading each component out of memory under control of a clock at a second, higher frequency.

6. A method according to claim 5, wherein the first and second frequencies are integral submultiples of 2,730 times the frequency at which the horizontal lines of the first signal format occur.

7. A method according to claim 5, wherein the first and second frequencies are integral submultiples of 2,880 times the frequency at which the horizontal lines of the first signal format occur.

8. A method according to claim 5, wherein the step of time-division multiplexing is accomplished by reading the luminance and chrominance components out of memory during different respective time slots.

9. A method according to claim 4, wherein the aggregate duration of the three time slots into which the luminance and chrominance components are multiplexed during each said interval is less than the period corresponding to the rate at which the lines of the first signal format occur, and said information is incorporated within the output video signal in a time slot that occurs at the same rate as the lines of the first signal format.

10. A method according to claim 4, wherein the steps of time-compressing the luminance and chrominance components and time-division multiplexing the luminance and chrominance components is accomplished by digitizing the luminance component under control of a clock at a first frequency, digitizing the chrominance components under control of a clock at a second, lower frequency, writing the digitized components into memory under control of clocks at said first and second frequencies respectively, and reading the digitized components out of memory during different respective time slots under control of a clock at a third frequency that is higher than the first frequency.

11. A method according to claim 4, wherein the step of time-compressing the luminance and chrominance components and time-division multiplexing the luminance and chrominance components is accomplished by digitizing the luminance component under control of a clock at a first frequency, digitizing the chrominance components under control of respective clocks at second and third lower frequencies, writing the digitized components into memory under control of clocks at said first, second and third frequencies respectively, and reading the digitized components out of memory during different respective time slots under control of a clock at a fourth frequency that is higher than the first frequency.

12. A method according to claim 1, further comprising converting said output video signal to a signal of said second format by time-expanding the luminance and chrominance components of the output video signal and bringing said components into time-coincident relationship, and utilizing said information to define, within the scene represented by the output video signal, a selected portion having said second aspect ratio, and excluding from the signal of said second format portions of the luminance and chrominance components that correspond to areas of the scene represented by the output video signal that are outside said selected portion.

13. A method according to claim 12, wherein the lines and raster of the second signal format occur at the same rates as the lines and raster of the first signal format, and the intervals containing said time slots occur at the same rate as the lines of the first signal format.

14. A method according to claim 13, wherein the step of time-expanding the luminance and chrominance components is accomplished by digitizing each component and writing it into memory under control of a clock at a first frequency, and reading each component out of memory under control of a clock at a second, lower frequency.

15. A method according to claim 14, wherein the first and second frequencies are integral submultiples of 2,730 times the frequency at which the horizontal lines of the first signal format occur.

16. A method according to claim 14, wherein the first and second frequencies are integral submultiples of 2,880 times the frequency at which the horizontal lines of the first signal format occur.

17. A method according to claim 13, wherein the step of bringing the components into timecoincident relationship is accomplished by reading the luminance and chrominance components out of memory simultaneously.

18. A method according to claim 13, wherein the step of time-expanding the luminance and chrominance components and bringing the luminance and chrominance components into time-coincident relationship is accomplished by digitizing each component and writing it into memory under control of a clock at a first frequency, and simultaneously reading the luminance component out of memory under control of a clock at a second, intermediate frequency and reading the chrominance components out of memory under control of a clock at a third, lower frequency.

19. A method according to claim 13, wherein the step of time-expanding the luminance and chrominance components and bringing the luminance and chrominance components into time-coincident relationship is accomplished by digitizing each component and writing it into memory under control of a clock at a first frequency, and simultaneously reading the luminance component out of memory under control of a clock at a second, intermediate frequency and reading the two chrominance components out of memory under control of respective clocks at third and fourth lower frequencies.

20. A method of converting an input video signal of a first format into an output video signal of a second format, a signal of said first format
    (a) being representative of a scene having a first aspect ratio,
    (b) comprising signal elements corresponding to a plurality of horizontal line intervals of a raster, said lines and said raster occurring at respective predetermined rates,
    (c) including in each horizontal line interval, in time-compressed sequential relationship, a luminance component and two chrominance components, and
    (d) incorporating information representative of a number in the range from zero to the difference between said first aspect ratio and a second, smaller aspect ratio,
and a signal of said second format
    (a) being representative of a scene having said second aspect ratio,
    (b) comprising signal elements corresponding to a plurality of horizontal line intervals of a raster, said lines and said raster of the second signal format occurring at respective predetermined rates, and
    (c) including in each horizontal line interval a luminance component and two chrominance components in time-coincident relationship,
said method comprising time-expanding the luminance and chrominance components of the input video signal and bringing said components into time-coincident relationship, utilizing said information to define, within the scene represented by the input video signal, a selected portion having said second aspect ratio, and excluding from the output video signal portions of the luminance and chrominance components that correspond to areas of the scene represented by the input video signal that are outside said selected portion.

21. A method according to claim 20, wherein the lines and raster of the first signal format occur at the same rates as the lines and raster of the second signal format.

22. A method according to claim 20, wherein the raster of the second signal format occurs at the same rate as the raster of the first signal format, and the number of lines in the raster of the second format is equal to the number of lines in the raster of the first signal format divided by a positive integer.

23. A method according to claim 22, wherein said positive integer is equal to one.

24. A method according to claim 23, wherein the step of time expanding the luminance and chrominance components of the input video signal is accomplished by digitizing each component and writing it into memory under control of a clock at a first frequency, and reading each component out of memory under control of a clock at a second, higher frequency.

25. A method according to claim 24, wherein the first and second frequencies are integral submultiples of 2,730 times the frequency at which the horizontal lines of the first signal format occur.

26. A method according to claim 24, wherein the first and second frequencies are integral submultiples of 2,880 times the frequency at which the horizontal lines of the first signal format occur.

27. A method according to claim 24, wherein the step of bringing the components into time-coincident relationship is accomplished by reading the luminance and chrominance components out of memory simultaneously.

28. Apparatus for generating, from an input video signal of a first format, an output video signal that can be converted to a second format, a signal of said first format (a) being representative of a scene having a first aspect ratio,
(b) comprising signal elements corresponding to a plurality of horizontal line intervals of a raster, said lines and said raster occurring at respective predetermined rates, and
(c) including in each horizontal line interval, in time-coincident relationship, information relating to the amplitude of three primary color components of the scene, and a signal of said second format
(a) being representative of a scene having a second aspect ratio, smaller than said first aspect ratio,
(b) comprising signal elements corresponding to a plurality of horizontal line intervals of a raster, said lines and said raster of the second signal format occurring at respective predetermined rates, and
(c) including in each horizontal line interval a luminance component and two chrominance components in time-coincident relationship, said apparatus comprising means for forming a luminance component and two chrominance components from the signal elements of the input video signal, means for time-compressing the luminance and chrominance components and time-division multiplexing the luminance and chrominance components respective time slots during a succession of intervals occurring at a predetermined rate, and means for incorporating within the output video signal information representative of a number in the range from zero to the difference between said aspect ratios.

29. Apparatus according to claim 28, wherein the raster of the second signal format occurs at the same rate as the raster of the first signal format, and the number of lines in the raster of the second format is equal to the number of lines in the raster of the first signal format, and the means for time-compressing and time-division multiplexing the luminance and chrominance components comprise means for multiplexing said components into respective time slots during intervals that occur at the same rate as the lines of the first and second signal formats.

30. Apparatus according to claim 29, wherein the means for time-compressing the luminance and chrominance components and time-division multiplexing the luminance and chrominance components comprise means for digitizing each component and writing it into memory under control of a clock at a first frequency, and reading each component out of memory under control of a clock at a second, higher frequency.

31. Apparatus according to claim 30, comprising a master clock generator for generating a master clock at a frequency 2,730 times the frequency at which the horizontal lines of the first signal format occur, and frequency divider means for generating the clocks at the first and second frequencies by dividing the frequency of the master clock by at least first and second integers.

32. Apparatus according to claim 30, comprising a master clock generator for generating a master clock at a frequency 2,880 times the frequency at which the horizontal lines of the first signal format occur, and frequency divider means for generating the clocks at the first and second frequencies by dividing the frequency of the master clock by at least first and second integers.

33. Apparatus according to claim 30, wherein the means for time-compressing the luminance and chrominance components and time-division multiplexing the luminance and chrominance components comprise means for reading the digitized components out of memory during different respective time slots.

34. Apparatus according to claim 29, wherein the aggregate duration of the three time slots into which the luminance and chrominance components are multiplexed during each said interval is less than the period corresponding to the rate at which the lines of the first signal format occur, and the means for incorporation said information into the output video signal comprise means for time-division multiplexing said information into a fourth time mslot that occurs at the same rate as the lines of the first signal format.

35. Apparatus for converting an input video signal of a first format into an output video signal of a second format, a signal of said first format
(a) being representative of a scene having a first aspect ratio,
(b) comprising signal elements corresponding to a plurality of horizontal line intervals of a raster, said lines and said raster occurring at respective predetermined rates, and
(c) including in each horizontal line interval, in time-compressed sequential relationship, a luminance component and two chrominance components, and
(d) incorporating information representative of a number in the range from zero to the difference between said first aspect ratio and a second, smaller aspect ratio, and a signal of said second format
(a) being representative of a scene having said second aspect ratio,
(b) comprising signal elements corresponding to a plurality of horizontal line intervals of a raster, said lines and said raster of the second signal format occurring at respective predetermined rates, and
(c) including in each horizontal line interval a luminance component and two chrominance components in time-coincident relationship, said apparatus comprising means for timeexpanding the luminance and chrominance components of the input video signal and bringing said components into time-coincident relationship, and means for utilizing said information to define, within the scene represented by the input video signal, a selected portion having said second aspect ratio and to exclude from the output video signal portions of the luminance and chrominance components that correspond to areas of the scene represented by the input video signal that are outside said selected portion.

36. Apparatus according to claim 35, wherein the raster of the second signal format occurs at the same rate as the raster of the first signal format, and the number of lines in the raster of the second format is equal to the number of lines in the raster of the first signal format, and the means for time-compressing and time-division multiplexing the luminance and chrominance components comprise means for multiplexing said components into respective time slots during intervals that occur at the same rate as the lines of the first and second signal formats.

37. Apparatus according to claim 36, wherein the means for time-expanding the luminance and chrominance components of the input video signal and bringing said components into time-coincident relationship comprise means for digitizing each component and writing it into memory under control of a clock at a first frequency, and reading each component out of memory under control of a clock at a second, lower frequency.

38. Apparatus according to claim 37, comprising a master clock generator for generating a master clock at a frequency 2,730 times the frequency at which the horizontal lines of the first signal format occur, and frequency divider means for generating the clocks at the first and second frequencies by dividing the frequency of the master clock by at least first and second integers.

39. Apparatus according to claim 37, comprising a master clock generator for generating a master clock at a frequency 2,880 times the frequency at which the horizontal lines of the first signal format occur, and frequency divider means for generating the clocks at the first and second frequencies by dividing the frequency of the master clock by at least first and second integers.

40. Apparatus according to claim 37, wherein the means for bringing the luminance and chrominance components into time-coincident relationship comprise means for reading the digitized components out of memory simultaneously.

* * * * *